2,734,920

NEW CHEMICAL COMPOUNDS AND THEIR PREPARATION

William T. Hunter, Minneapolis, Minn., and Johannes S. Buck, Albany, N. Y., assignors to Sterling Drug Inc., New York, N. Y., a corporation of Delaware No Drawing. Application December 14, 1954, Serial No. 475,280

17 Claims. (Cl. 260—570.9)

This invention relates to new compounds having the formula

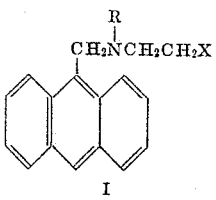

I wherein X is selected from the class consisting of hydroxy, chlorine, bromine and iodine, and R is selected from the class consisting of hydrogen and lower-alkyl groups. The invention also relates to acid-addition salts of the above compounds and to processes for the preparation of said compounds and salts.

In the above formula R represents hydrogen or a lower-alkyl group. The lower-alkyl group can have from one to about six carbon atoms, thus including such groups as methyl, ethyl, propyl, isopropyl, butyl, isobutyl, secondary-butyl, pentyl, isopentyl, hexyl, isohexyl and the like.

The compounds of the invention are prepared by the chemical transformations outlined in the following flowsheet.

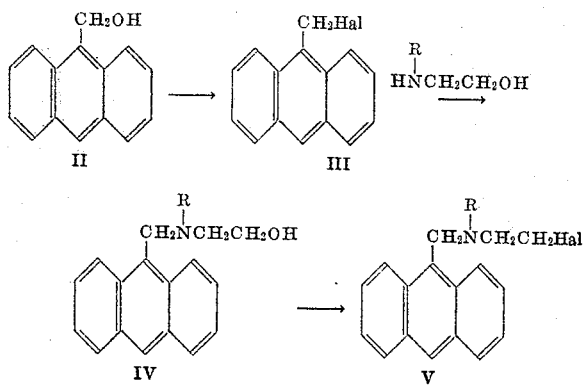

In the above formulas Hal stands for a halogen atom selected from chlorine, bromine, and iodine, and R has the same meaning as given above.

9-hydroxymethylanthracene is converted to a 9-halomethylanthracene by reacting the former with one of various reagents which replace primary alcoholic hydroxy groups by halogen. Such reagents include aqueous hydrogen halides, e. g., hydrobromic acid in the presence of sulfuric acid, hydrochloric acid in the presence of zinc chloride, and hydriodic acid (preferably formed in situ from an alkali metal iodide and phosphoric acid); phosphorus halides, e. g., phosphorus trichloride, phosphorus pentachloride, phosphorus tribromide, and phosphorus triiodide (preferably formed in situ from phosphorus and iodine); and thionyl halides, e. g., thionyl chloride and thionyl bromide. The 9-halomethylanthracene (III) is then reacted with a 2-hydroxyethylamine, $HN(R)CH_2CH_2OH$, to give an N-(2-hydroxyethyl)-9-methylanthracene (IV; I, X=OH); the reaction is carried out by heating the reactants in an inert solvent. The N-(2-haloethyl)-9-methylanthracene (V; I, X=Hal) is prepared from the hydroxyethyl compounds IV by reacting the latter with a halogen substituting reagent such as one of the hydrohalic acids, phosphorus halides or thionyl halides described above for the conversion of 9-hydroxymethylanthracene to 9-halomethylanthracene. The hydrohalide salt of V is produced in the reaction.

The compounds of the invention can be obtained and utilized in the form of acid-addition salts and these salts are within the purview of the invention. The acids which can be used to prepare acid-addition salts are preferably those which produce when combined with the free base, salts whose anions are relatively innocuous to animal organisms in therapeutic doses of the salts, so that the beneficial physiological properties inherent in the free base are not vitiated by side effects ascribable to the anions. Appropriate acid-addition salts are those derived from mineral acids such as hydrochloric acid, hydrobromic acid, hydriodic acid, nitric acid, phosphoric acid and sulfuric acid; and organic acids such as acetic acid, citric acid, tartaric acid, lactic acid, and the like, giving the hydrochloride, hydrobromide, hydriodide, nitrate, phosphate or acid phosphate, sulfate or bisulfate, acetate, citrate or acid citrate, tartrate or bitartrate, and lactate salts, respectively.

The following examples will illustrate the invention more fully, but the latter is not to be limited thereby.

EXAMPLE 1

(a) *9-chloromethylanthracene*

A solution of 6.5 g. (0.031 mole) of 9-hydroxymethylanthracene and 5.0 g. (0.042 mole) of thionyl chloride in 50 cc. of dioxane (purified by boiling with sodium and distilling) was refluxed for three hours. The dioxane and excess thionyl chloride were removed by distillation at reduced pressure, and the solid residue was recrystallized from benzene-petroleum ether (Skellysolve B), giving 5.25 g. of 9-chloromethylanthracene. When recrystallized again from benzene-petroleum ether, a sample was obtained in the form of long yellow needles, M. P. 141–142.5° C.

*Anal.*—Calcd. for $C_{15}H_{11}Cl$: C, 79.47; H, 4.89; Cl, 15.64. Found: C, 79.85; H, 5.28; Cl, 15.50.

9-hydroxymethylanthracene can be reacted with phosphorus tribromide or with potassium iodide in phosphoric acid to give 9-bromomethylanthracene or 9-iodomethylanthracene, respectively.

(b) *N-(2-hydroxyethyl)-9-aminomethylanthracene*

A solution of 15 g. (0.066 mole) of 9-chloromethylanthracene in 500 cc. of dioxane was added dropwise over a period of about twelve hours to a stirred refluxing solution of 32.8 g. (0.54 mole) of 2-hydroxyethylamine in 100 cc. of dioxane. The reaction mixture was refluxed for an additional two hours and the dioxane was removed by distillation. The crystalline residue was washed with water, dried in vacuo and recrystallized from benzene giving 13.6 g. of N-(2-hydroxyethyl)-9-aminomethylanthracene, M. P. 116–119° C. A sample when recrystallized again from benzene had the M. P. 120–122° C.

A portion of the free base was treated with ethanolic hydrogen chloride, and the acid-addition salt which formed was recrystallized from absolute ethanol, giving N-(2-hydroxyethyl)-9-aminomethylanthracene hydrochloride, M. P. 223–225° C. (corr.).

*Anal.*—Calcd. for $C_{17}H_{17}NO \cdot HCl$: C, 70.95; H, 6.30; Cl, 12.32. Found: C, 71.30; H, 6.39; Cl, 12.20.

N-(2-hydroxyethyl) - 9 - aminomethylanthracene hydrochloride was found to have an antifibrillatory activity about 1.5 times that of procaine hydrochloride when tested on the isolated perfused rabbit heart in which ventricular fibrillation had been initiated by injection of a hypertonic solution of calcium chloride.

N-(2-hydroxyethyl) - 9 - aminomethylanthracene can also be produced by heating 9-bromomethylanthracene or 9-iodomethylanthracene with an excess of 2-hydroxyethylamine.

EXAMPLE 2

N-(2-chloroethyl)-9-aminomethylanthracene hydrochloride

A mixture of 5.3 g. of N-(2-hydroxyethyl)-9-aminomethylanthracene hydrochloride, 50 cc. of thionyl chloride and 50 cc. of chloroform was refluxed for forty-five minutes. The chloroform and excess thionyl chloride were removed by distillation at reduced pressure. The residue was stirred with absolute ethanol, collected by filtration and recrystallized twice from absolute ethanol to give 2.1 g. of N-(2-chloroethyl)-9-aminomethylanthracene hydrochloride, M. P. 205–207° C.

EXAMPLE 3

N-(2-hydroxyethyl)-N-ethyl-9-aminomethylanthracene

A mixture of 15 g. (0.066 mole) of 9-chloromethylanthracene and 12 g. (0.135 mole) of N-(2-hydroxyethyl)ethylamine in 500 cc. of dry benzene was refluxed for eight hours. The reaction mixture was cooled, the benzene solution was decanted from some undissolved oil (probably largely N-(2-hydroxyethyl)-ethylamine hydrochloride), and the benzene solution was washed twice with water and dried over anhydrous sodium sulfate. The benzene was removed by distillation and the residue was recrystallized from about 75 cc. of petroleum ether (Skellysolve B), giving a mixture of prisms and yellow needles. The yellow needles were separated manually from the prisms and recrystallized from petroleum ether, giving 0.55 g. of unreacted 9-chloromethylanthracene, M. P. 140–142° C. The prisms were recrystallized from petroleum ether (Skellysolve B) giving 7.5 g. of N-(2-hydroxyethyl)-N-ethyl-9-aminomethylanthracene, M. P. 73–75° C.

A portion of the free base was converted to its hydrochloride salt by treatment with ethanolic hydrogen chloride. The acid-addition salt which separated was recrystallized from absolute ethanol, giving N-(2-hydroxyethyl)-N-ethyl - 9 - aminoethylanthracene hydrochloride, M. P. 208–210.5° C. (corr.).

Anal.—Calcd. for $C_{19}H_{22}ONCl$: C, 72.25; H, 7.02; Cl, 11.23. Found: C, 72.57; H, 7.19; Cl, 11.12.

N-(2-hydroxyethyl)-N-ethyl - 9 - aminomethylanthracene hydrochloride was found to have an antifibrillatory activity 5 times that of procaine hydrochloride when measured in the isolated perfused rabbit heart in which ventricular fibrillation had been initiated by injection of a hypertonic solution of calcium chloride.

9-chloromethylanthracene can be reacted according to the above manipulative procedure with (2-hydroxyethyl)methylamine, (2-hydroxyethyl)propylamine, (2-hydroxyethyl)isopropylamine, (2-hydroxyethyl)butylamine, (2-hydroxyethyl)hexylamine or (2-hydroxyethyl)isohexylamine, to give N-(2-hydroxyethyl)-N-methyl-9-aminomethylanthracene, N - (2 - hydroxyethyl) - N - propyl-9-aminomethylanthracene, N-(2-hydroxyethyl) - N - isopropyl - 9 - aminomethylanthracene, N-(2-hydroxyethyl)-N-butyl-9-aminomethylanthracene, N-(2-hydroxyethyl) - N-hexyl-9-aminomethylanthracene or N-(2-hydroxyethyl)-N-isohexyl-9-aminomethylanthracene, respectively. The 9-chloromethylanthracene can be replaced by 9-bromoethylanthracene or 9-iodomethylanthracene in the above reactions.

EXAMPLE 4

N-(2-chloroethyl)-N-ethyl-9-aminomethylanthracene hydrochloride

A solution of 15 g. of N-(2-hydroxyethyl)-N-ethyl-9-aminomethylanthracene hydrochloride and 100 cc. of thionyl chloride in 100 cc. of chloroform was refluxed for one hour. The chloroform and excess thionyl chloride were removed by distillation, and about 100 cc. of absolute ethanol was added to the residue. The latter was dissolved by warming, and ether was added to the point of turbidity. The product which crystallized upon cooling was collected by filtration and recrystallized from an alcohol-ether mixture, giving 10.9 g. of N-(2-chloroethyl)-N-ethyl-9-aminomethylanthracene hydrochloride, M. P. 169–171° C. (dec.) (corr.).

Anal.—Calcd. for $C_{19}H_{20}ClN \cdot HCl$: C, 68.26; H, 6.33; Cl, 10.61. Found: C, 68.05; H, 6.54; Cl, 10.87.

N-(2-chloroethyl)-N-ethyl - 9 - aminomethylanthracene hydrochloride was found to have adrenolytic activity in dogs as evidenced by the fact that at a dose level of 0.125 mg./kg. of body weight the compound inhibited the hypertension produced by 1-epinephrine, and at dose levels of 0.25 mg./kg. and higher the compound reversed the hypertension produced by 1-epinephrine, as determined by measuring the carotid arterial pressure in anesthetized dogs.

N-(2-bromoethyl)-N-ethyl - 9 - aminomethylanthracene hydrobromide can be prepared by reacting N-(2-hydroxyethyl) - N - ethyl-9-aminomethylanthracene with phosphorus tribromide. N-(2-iodoethyl) - N - ethyl-9-aminomethylanthracene hydriodide can be prepared by reacting N-(2-hydroxyethyl)-N-ethyl - 9 - aminomethylanthracene with potassium iodide in phosphoric acid.

N-(2-chloroethyl)-N-methyl - 9 - aminomethylanthracene hydrochloride, N-(2-chloroethyl)-N-propyl-9-aminomethylanthracene hydrochloride, N - (2 - chloroethyl)-N-isopropyl-9-aminomethylanthracene hydrochloride, N-(2-chloroethyl)-N-butyl - 9 - aminomethylanthracene hydrochloride, N-(2-chloroethyl)-N-hexyl - 9 - aminomethylanthracene hydrochloride or N-(2-chloroethyl)-N-isohexyl-9-aminomethylanthracene hydrochloride can be prepared by reacting N-(2-hydroxyethyl) - N - methyl - 9 - aminomethylanthracene hydrochloride, N-(2-hydroxyethyl)-N-propyl-9-aminomethylanthracene hydrochloride, N-(2-hydroxyethyl) - N - isopropyl - 9 - aminomethylanthracene hydrochloride, N-(2-hydroxyethyl)-N-butyl - 9 - aminomethylanthracene hydrochloride, N-(2-hydroxyethyl)-N-hexyl-9-aminomethylanthracene hydrochloride or N-(2-hydroxyethyl) - N - isohexyl - 9 - aminomethylanthracene hydrochloride, respectively, with thionyl chloride according to the manipulative procedure given above in Example 4.

EXAMPLE 5

N-(2-bromoethyl)-N-ethyl-9-aminomethylanthracene hydrobromide

A solution of 6.3 g. of thionyl bromide in 25 ml. of chloroform was added to a slurry of 10.8 g. of N-(2-hydroxyethyl)-N-ethyl-9-aminomethylanthracene hydrobromide (M. P. 184–186° C., prepared by treatment of the free base with alcoholic hydrogen bromide), and the mixture was refluxed on a steam bath for one and one-half hours. After standing for about fifteen hours at room temperature, the reaction mixture was concentrated to dryness in vacuo on a steam bath. The residue was dissolved in absolute ethanol, the solution decolorized with activated charcoal and ether added to the point of turbidity. Upon cooling crystalline material separated, and this was obtained by decanting the supernatant solution. The crystalline material was triturated with boiling ethyl acetate and then recrystallized twice from an isopropyl alcohol-ether mixture and dried in vacuo at 65° C. for eight hours, giving N-(2-bromoethyl) - N - ethyl-9-aminomethylanthracene hydrobromide, M. P. 145–148° C.

Pharmacological evaluation of the hydroxy-substituted substances within the scope of the present invention has shown, as above indicated, that such materials have an antifibrillatory activity above that of procaine. Pharmacological testing of the halogen-containing substances herein claimed by measuring their effect upon the carotid arterial pressure in dogs made hypertensive with 1-epinephrine shows such materials possess adrenolytic activity.

What is claimed is:

1. A compound selected from the group consisting of compounds having the formula

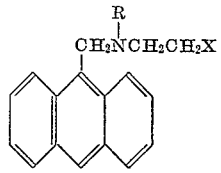

wherein X is selected from the class consisting of hydroxy, chlorine, bromine and iodine, and R is selected from the class consisting of hydrogen and lower-alkyl groups; and acid-addition salts thereof.

2. An acid-addition salt of N-(2-hydroxyethyl)-9-aminomethylanthracene.

3. An acid-addition salt of N-(2-chloroethyl)-9-aminomethylanthracene.

4. An acid-addition salt of N-(2-hydroxyethyl)-N-(lower-alkyl)-9-aminomethylanthracene.

5. An acid-addition salt of N-(2-chloroethyl)-N-(lower-alkyl)-9-aminomethylanthracene.

6. An acid-addition salt of N-(2-bromoethyl)-N-(lower-alkyl)-9-aminomethylanthracene.

7. N-(2 - hydroxyethyl) - 9 - aminomethylanthracene hydrochloride.

8. N-(2-chloroethyl)-9-aminomethylanthracene hydrochloride.

9. An acid-addition salt of N-(2-hydroxyethyl)-N-ethyl-9-aminomethylanthracene.

10. N - (2 - hydroxyethyl) - N-ethyl - 9 - aminomethylanthracene hydrochloride.

11. An acid-addition salt of N-(2-chloroethyl)-N-ethyl-9-aminomethylanthracene.

12. N - (2 - chloroethyl) - N - ethyl - 9 - aminomethylanthracene hydrochloride.

13. An acid-addition salt of N-(2-bromoethyl)-N-ethyl-9-aminomethylanthracene.

14. N - (2 - bromoethyl) - N - ethyl - 9 - aminomethylanthracene hydrobromide.

15. The process for preparing a compound having the formula

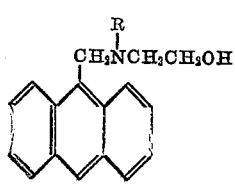

wherein R is selected from the class consisting of hydrogen and lower-alkyl groups, which comprises reacting a 9-halomethylanthracene with an amine having the formula $HN(R)CH_2CH_2OH$.

16. The process for preparing a hydrohalide salt of a compound having the formula

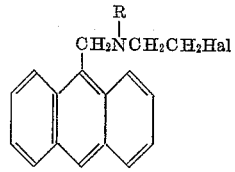

wherein Hal is a halogen atom selected from the class consisting of chlorine, bromine and iodine, and R is selected from the class consisting of hydrogen and lower-alkyl groups, which comprises reacting a compound having the formula

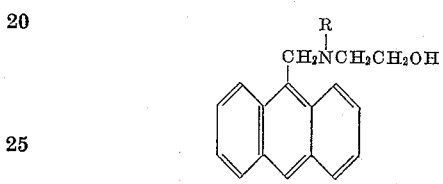

with a member of the class consisting of hydrohalic acids, phosphorus halides and thionyl halides.

17. The process for preparing a hydrohalide salt of a compound having the formula

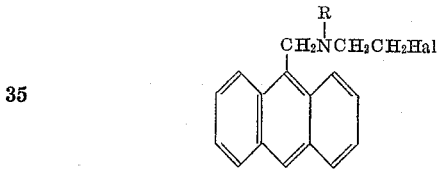

wherein Hal is a halogen atom selected from the class consisting of chlorine, bromine and iodine, and R is selected from the class consisting of hydrogen and lower-alkyl groups, which comprises reacting a 9-halomethylanthracene with an amine having the formula

$HN(R)CH_2CH_2OH$ and then reacting the resulting N-(2-hydroxyethyl)-N-(R)-9-methylanthracene with a member of the class consisting of hydrohalic acids, phosphorus halides and thionyl halides.

No references cited.